(12) United States Patent
Spracklen

(10) Patent No.: US 7,003,653 B2
(45) Date of Patent: Feb. 21, 2006

(54) METHOD FOR RAPID INTERPRETATION OF RESULTS RETURNED BY A PARALLEL COMPARE INSTRUCTION

(75) Inventor: Lawrence Spracklen, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 305 days.

(21) Appl. No.: 10/277,639

(22) Filed: Oct. 21, 2002

(65) Prior Publication Data

US 2004/0078556 A1    Apr. 22, 2004

(51) Int. Cl.
*G06F 9/305* (2006.01)
(52) U.S. Cl. .......................... 712/300; 712/5; 712/22; 712/223; 712/224
(58) Field of Classification Search ................ 712/5, 712/22, 300
See application file for complete search history.

(56) References Cited

U.S. PATENT DOCUMENTS

| 5,659,698 A | 8/1997 | Weng et al. |
| 5,935,239 A * | 8/1999 | Narayan ............... 712/224 |
| 6,552,937 B1 * | 4/2003 | Ladner et al. ........... 365/200 |

FOREIGN PATENT DOCUMENTS

| WO | WO 00/22511 | 4/2000 |
| WO | WO 01/98893 | 12/2001 |

* cited by examiner

*Primary Examiner*—Kenneth S. Kim
(74) *Attorney, Agent, or Firm*—Gunnison, McKay & Hodgson, L.L.P.; Philip J. McKay

(57) ABSTRACT

A method for rapidly mapping a bitmask returned by a Single Instruction Multiple Data (SIMD) computer compare instruction is provided. A user supplied partitioned mapping variable includes multiple mapping elements. Each of the multiple mapping elements is applied to the inputs of a different one of multiple digital multiplexers. The bitmask returned by the SIMD compare instruction is applied to the selects or all of the multiple digital multiplexers. Each multiplexer outputs one bit, as selected by the bitmask, from the respective mapping element applied to each multiplexer. The one bit outputs are accumulated in a mapped output variable as a mapped bitmask.

9 Claims, 7 Drawing Sheets

METHOD FOR RAPID INTERPRETATION OF RESULTS RETURNED BY A PARALLEL COMPARE INSTRUCTION

BACKGROUND OF THE INVENTION

1. Field of the Invention

The present invention relates generally to methods for the interpretation of the results returned by computer instructions, and more particularly to the mapping of the results returned by a Multi-way, Single Instruction Multiple Data (SIMD) compare instruction.

2. Description of Related Art

A computer information base, sometimes called a database, contains an array of data records, each having one or more attributes or fields.

Conceptually, an information base frequently takes the form of a large table of organized data. The data is structured in some order about "key" fields, each associated with a respective "data entry" field. Each key field is for storing a key value, sometimes called a data key, and each associated data entry field is for storing a data value. Examples of such data structures include ordered lists, trees, indexes, hashed indexes, and a number of other variations. Such ordered information base tables have found wide use in a variety of settings and it is anticipated that their use in digital signal processing, data compression, and database management applications will only increase as more and more data is collected and stored for personal and commercial transactions.

It is frequently desirable to search for and retrieve certain information stored in an information base on the basis of queries. A query directs a computerized search for all records in the information base that have a data key that satisfies certain specified conditions. A search value, sometimes called a search key, is used to return the desired data value(s) from the ordered information base. The search key is compared, in a specified way, to the data keys in the information base. The data value associated with a data key is retrieved whenever a data key is located that correlates, as specified, to the search key.

Methods currently used to perform selective searches of ordered tables fall into two broad classes—linear and recursive.

The linear search method involves an exhaustive examination of each of the data keys of an information base table to find those meeting the specifications of the search key query. In a linear search of a information base, a search begins at an upper or lower bound of the table and progresses sequentially through the information base until the desired data key is located that matches the specified search key or until the opposite bound of the table is reached. The associated data value is retrieved when a match occurs.

Linear iterative searching is impractical for large tables, i.e. tables having a relatively large number of record entries, due to the length of time necessary to compare the search key with the data key associated with each data value in the information base.

To improve upon the performance of the linear search, ordered tables are commonly probed using the second broad search method involving the recursive approach. In the recursive search approach, the overall data structure of the information base is organized to be partially composed of other instances of the data structure. For example, an overall alphabetical list of names is a recursive data structure that may be thought of as being composed of an alphabetical list of names from A through M together with a contiguous alphabetical list of names from N through Z. A data "tree" structure, composed of smaller trees (subtrees), is a recursive data structure well known in the art. Recursive search methods take advantage of the organization of the records within the information base. Where applicable, a recursive search on an organized data structure provides much faster data value access than an iterative linear search.

One well-known and widely applied type of recursive search is the binary search, a dichotomizing search in which the information base table to be searched is first organized into a tree structure. At each compare iteration the tree is divided into two parts.

Both linear and recursive search methods contain two basic modules—a comparator and a next address generator. The comparator, typically an instruction executable on the computer, compares the value of the search key with the value of the data key. The next address generator receives the comparison result from the comparator and uses this result to determine the address of the next data key that should be searched.

In the iterative linear search, the comparison begins at the address of the data key at beginning or end of the information base. If the comparator returns a negative result, i.e., no compare match between the data key and the search key, the next sequential data key in the information base is compared with the search key. Typically, a pointer is incremented one record length to direct the comparison to the computer memory address of the next sequential data key to be compared. This compare and increment process is repeated until the final record of the information base table is reached.

A recursive binary search algorithm also includes a comparator and a next address generator. A binary search algorithm begins conducting a search at the middle of the information base table. The comparator, e.g. a computer compare instruction, compares the search key to the data key stored in the middle table record and sends a comparison result to the next address generator. The next address logic receives the comparison result from the comparator and uses this result to determine the address of the next record that should be searched. Binary search next address generators typically determine the next address using two pointers. At the beginning of a binary search, one pointer is positioned at the address of the data key of the top record of the table and the second pointer is positioned at the address of the bottom data key of the table. The number of record addresses between the pointers is then determined and divided in half (averaged) to identify the address of the data key of the middle record. One of the two pointers is then positioned at the middle data key. The comparator then compares the search key with the value stored in the middle data key and sends a comparison result to the next address generator. The next address generator uses the comparison result and the previous address to determine the address of the next data key that will be searched. If the search key is beyond the middle data key, the upper half of the information base table will be searched using the averaging technique described above and the lower half of the table will be eliminated from consideration. If the search key is not beyond the middle data key, the lower half of the table will be searched using the averaging technique and the upper half of the table will be eliminated from consideration. These comparing and eliminating steps are repeated until the search key correlates with a data key or until all table records have been searched.

Early computers included a central processing unit (CPU) that executed only one instruction at a time on a single set of data. In response to the need for improved performance, current computers utilize techniques to extend the capabilities of the computer to execute instructions.

By providing a set of specialized instructions and implementing circuitry, certain computer instructions may implement concurrently on multiple sets of data. This approach is known as single instruction, multiple data stream (SIMD) processing. SIMD distinguishes from the scalar, single instruction, single data stream (SISD) processing employed by earlier computers. SIMD instructions, capable of operating on multiple data sets in parallel, enhance computer performance.

A typical computer instruction refers to two input variables, sometimes called operands, on which the instruction operates and one output variable that receives the result of the instruction's action on the operands. With SIMD instructions, multiple operand data elements are packed within a variable. FIG. 1 is a schematic diagram illustrating multiple data element packed variable contained in a computer register 200, i.e., a high-speed computer circuit that holds values of internal operations, such as the instruction addresses, and operands processed by the computer. As will be appreciated by those of skill in the art, partitioning of data elements within registers is virtual. The various registers are, in fact, standard computer registers capable of containing, for example, 64 bits of binary data. As shown, register 200 contains multiple data elements A0 through A3, each of which is a logical subpart of partitioned data variable 202. A SIMD instruction can operate on multiple data elements A0 through A3 in parallel.

An important instruction within a typical SIMD instruction set is the multi-way SIMD compare instruction. The multi-way, SIMD compare instruction is analogous to the SISD compare instruction discussed above with reference to information base searches. However, a multi-way, SIMD compare instruction performs, in parallel, a simultaneous logical comparison between multiple corresponding data elements contained within two partitioned variables. As used herein, data elements in two different partitioned variables are corresponding if they occupy the same partition positions in the two variables. Multi-way, SIMD compare instructions are widely use to enhance performance of, for example, digital signal processing and data search algorithms by advantageously utilizing their parallel data processing functionality.

In a multi-way, SIMD compare instruction, a positive, sometimes called true, compare condition at the completion of instruction execution indicates that one or more sets of corresponding data elements in the two compared variables satisfies the specified logical comparison condition. The compare results are returned by the SIMD instruction.

However, once a compare condition exist, the actual results of the multi-way logical comparison must be investigated to determine which set or sets of corresponding data elements satisfied the comparison that generated the true compare condition.

The results of a multi-way, SIMD compare instruction are variously returned. For example, in the SUN Microsystems, Inc. Visual Instruction Set (VIS), as implemented on a UltraSPARC™ computer, the multi-way, SIMD compare instruction returns a compare bitmask to the least significant bits of a 32-bit compare input variable. Each bit in the compare bitmask represents the discrete logical result of one of the multiple parallel compare operations performed on the sets of corresponding data elements making up the two compared variables. A binary value "1" is typically written to bit positions reporting a logical correlation and a "0" to bit positions reporting no correlation between corresponding data elements in the compared variables.

A multi-way, SIMD compare instruction can be utilized to accelerate a variety of search algorithms by allowing a search key to be compared with multiple data keys in parallel. An example of an improved computer search method utilizing the SIMD multi-way compare instruction is the, Multi-array, sometimes called M-ary, search algorithm. The M-ary search takes advantage of the parallel processing functionality of the multi-way SIMD instructions at each iteration of the search cycle.

As noted, in many applications, and particularly in applications involving recursive searches the results of a multi-way, SIMD compare operation are ambiguous and must be interpreted and resolved. In order for a recursive information base search algorithm to generate the next address necessary for the search to continue, multi-way comparison results must be understood. Once a match condition has been achieved in the information base, additional processing is required to resolve the uncertainty associated with the absolute partition position of the matching corresponding data elements (data key/search key). In the VIS compare instruction for example, the bitmask must be examined to determine which of the sets of corresponding data elements satisfied the compare request. Note that in searches implemented with a SISD instruction, such as sequential linear searches, no such ambiguity occurs.

In the prior art, various techniques were utilized to resolve the uncertainty associated with the absolute partition position of matching corresponding data elements, such as data key/search key matches in information base table searches. Multiple conditional if/else structures, lookup tables, and Boolean algebraic transforms (manipulation) of the returned compare bitmask were prior art approaches to resolution of multi-way, SIMD compare results uncertainty. Thus, in the prior art, a significant computer performance "overhead" is associated with interpreting the compare results.

Additionally, in recursive, multi-way structure searches, it is necessary to interpret compare results on a per iteration basis in order to determine the data key addresses for the next cycle of the multi-way search. Furthermore, the next address determinations cannot commence until the result of the compare operation is available. Since the data key address variables required for the next iteration of the search cannot be determined until the compare result interpretation is complete, the entire overhead associated with this interpretation is visible. This situation typically has a large detrimental impact on the performance of SIMD compare instructions used in multi-way, recursive searches, such as M-ary searches.

Additionally, it is generally advantageous to provide for flexibility in directing the next execution step in a computer program conditioned on the result of a multi-way SIMD compare instruction. Preferably, the next step in the computer program should be determined rapidly with minimal use of computer resources.

Consequently, what is needed to fully realize the potential performance enhancement derived from a multi-way, SIMD compare instruction is a method that rapidly provides for manipulation or a generalized mapping of the results returned by a multi-way, SIMD compare instruction.

The prior art fails to provide an efficient approach to interpret the results of a multi-way SIMD compare instruction that reduces or eliminates results processing overhead. Further, the prior art fails to provide general flexibility in mapping multi-way, SIMD compare results. The full performance enhancement potential derived from multi-way, SIMD compare instructions is not realized in the prior art.

SUMMARY OF THE INVENTION

The present invention overcomes the limitations and disadvantages of the prior art by providing a method for the rapid interpretation of the results returned by a multi-way SIMD compare instruction. The method avoids the computer processing overhead associated with prior art approaches to interpretation. More particularly, the present invention provides for complete flexibility in the manipulation, sometimes called mapping, of the compare results returned by the multi-way SIMD instruction.

In one embodiment according to the principles of the present invention, an M-bit wide compare bitmask returned by a multi-way SIMD compare instruction is read and applied to the selects of each of M digital multiplexers, where M is a positive integer greater than 1. Each of the M multiplexers is adapted to receive M bit selects and $M^2$ bit inputs, and to output one bit. A user supplies an $M^3$-bit wide mapping variable that includes M mapping elements within the mapping variable, which is partitioned at $M^2$-bit wide boundaries. Each one of the M mapping elements of the $M^3$-bit wide mapping variable is applied to the inputs of a different one of the M multiplexers. Each of the one bit outputs of the M multiplexers is read and assembled as an M-bit wide mapped bitmask.

In this embodiment, the compare bitmask is mapped to the mapped bitmask. By appropriate selection of the mapping variable, the user may map the compare bitmask originally returned by the multi-way SIMD compare instruction to any possible permutation of a m-bit wide binary value. The mapped bitmask may be directly used, for example, to determine the next data key compare address of an M-ary search iteration. Consequently, using the method of the present invention, resort to the computer resource consumptive methods of the prior art, such as Boolean algebraic transformation, to interpret or map the compare bitmask returned by a multi-way SIMD compare instruction is eliminated.

BRIEF DESCRIPTION OF THE DRAWINGS

The accompanying drawings, which are incorporated in, and constitute a part of this specification, illustrate embodiments of the invention and, together with the description, serve to explain the principles of the invention. In the drawings.

DETAILED DESCRIPTION

The present invention provides a method for the rapid interpretation and generalized mapping of the results returned by a multi-way, SIMD compare instruction.

In one embodiment according to the principles of the present invention, a bitmask value returned by a multi-way, SIMD compare instruction is read and applied to the selects of multiple digital multiplexers. Each of the multiplexers is adapted to receive multiple binary select bits and multiple binary input bits, and to output one binary bit. A user-supplied, partitioned mapping variable includes contiguous multiple mapping elements within the mapping variable partitions. Each of the multiple mapping elements of the mapping variable is applied to the inputs of a different one of the multiple multiplexers. Each multiplexer outputs one bit, as selected by the bitmask applied to each multiplexer's selects, from the mapping element applied to the inputs of each of the multiplexer. The individual bits outputted by the multiplexers are read and assembled as a mapped bitmask in a mapped output variable. By appropriate selection of mapping variable, the user may map the originally returned compare bitmask value to any possible binary value in the mapped bitmask. The mapped bitmask may be directly used for any user-defined purpose.

Figure 1:
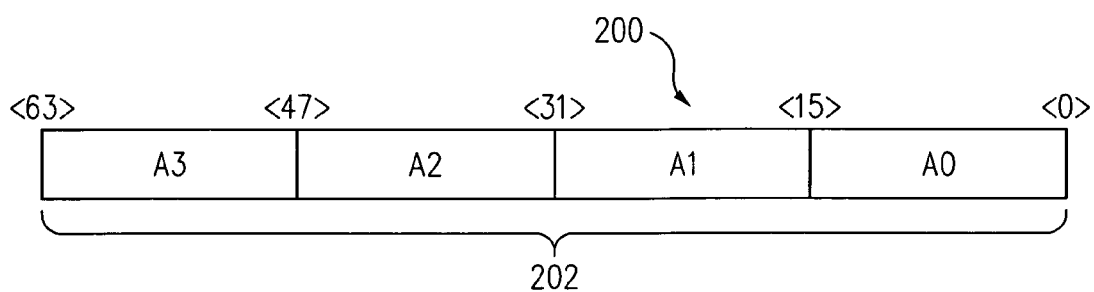
FIG. 1 is a schematic diagram illustrating a four-partition, packed variable contained in a computer register.
Figure 2:
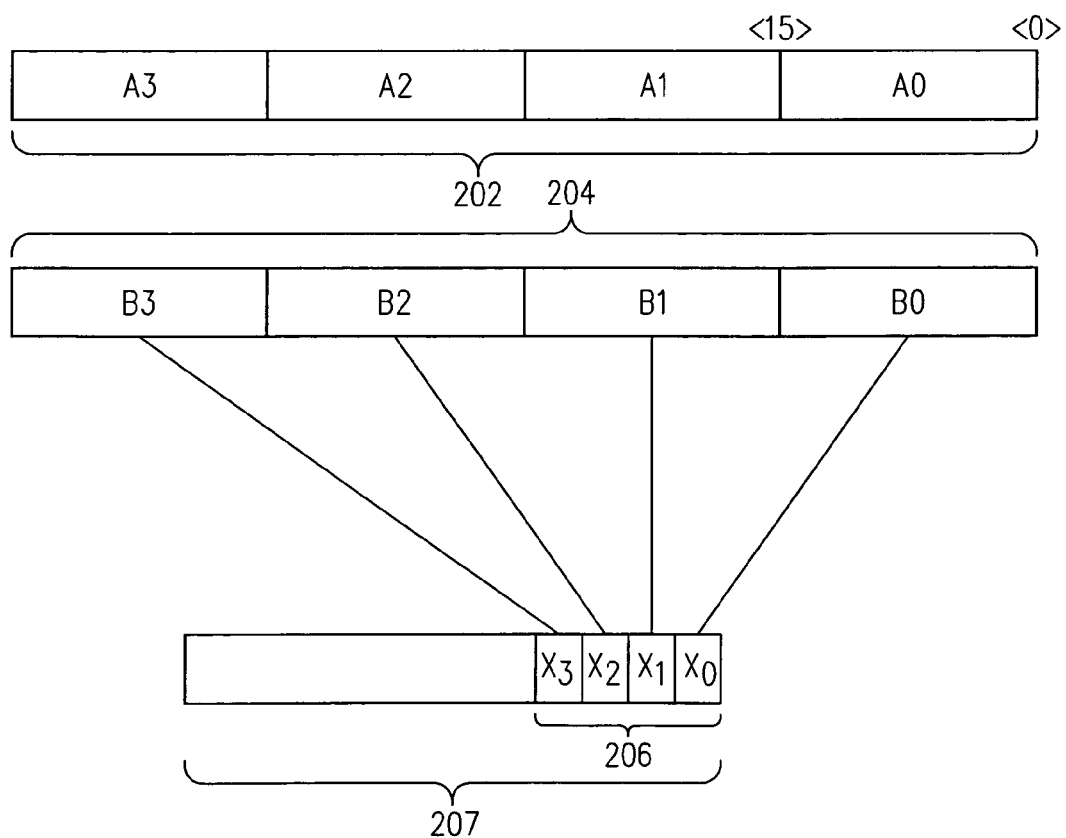
FIG. 2 is a schematic diagram illustrating the operation of a four-way, SIMD compare instruction.
Figure 3A:
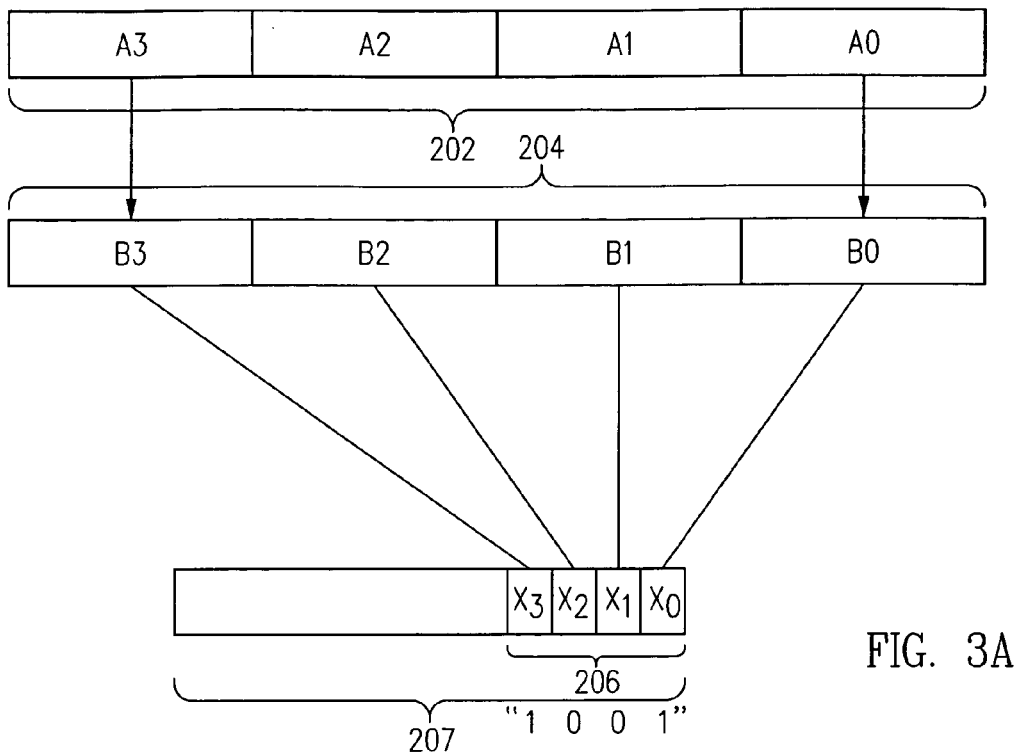
FIG. 3A and 3B are schematic diagrams illustrating two possible bitmask binary values returned by a 4-way, SIMD compare instruction.
Figure 3B:
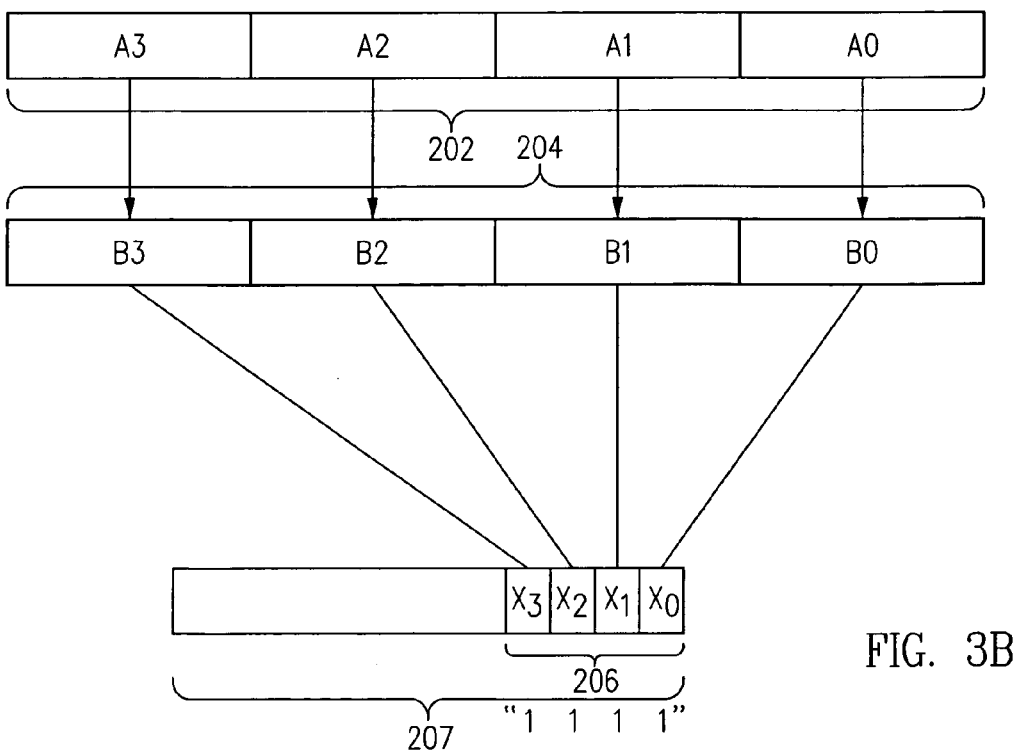

FIG. 2 illustrates the operation of a VIS, multi-way, SIMD compare instruction in returning the results of a logical comparison between the values of four 16-bit data element sets contained within two sixty-four bit partitioned variables. Corresponding data elements, i.e. data elements that occupy the same partition positions in each variable such as data elements A0 and B0 occupying the partition spanning 0–15 bit positions in a first data variable 202 and a second data variable 204, respectively, are compared in parallel with the results of each of the four individual compare operations indicated in a compare bitmask 206. Compare bitmask 206 is made up of bits $x_0$, $x_1$, $x_2$, and $x_3$ and is contained in a 32-bit compare input variable 207. FIG. 3A and FIG. 3B illustrate two possible bitmask values generated in compare input variable 207 at completion of execution of the four-way, SIMD, VIS compare instruction between four 16 bit data elements A0, A1, A2, and A3 in first 64-bit partitioned floating point data variable 202 and corresponding data elements containing data B0, B1, B2, and B3 in second 64-bit partitioned floating point data variable 204. As shown in FIGS. 3A, compare input variable 207 contains the value "1001" in compare bitmask 206. The binary "1's" in compare bitmask 206 indicate that the data values in data element A0 and corresponding data element B0 and the data values in data elements A3 and corresponding data element B3, respectively, satisfy the requested logical comparison. The binary "0's" in compare bitmask 206 indicate failure of the logical compare condition between data element A1 and corresponding data element B1 and failure of the logical compare condition between data element $A_2$ and corresponding data element B2. As shown by bitmask value "1111" of bitmask 206 in FIG. 3B, all data elements A0-A3 satisfy the comparison condition with their respective corresponding data elements B0-B3.

Figure 4A:
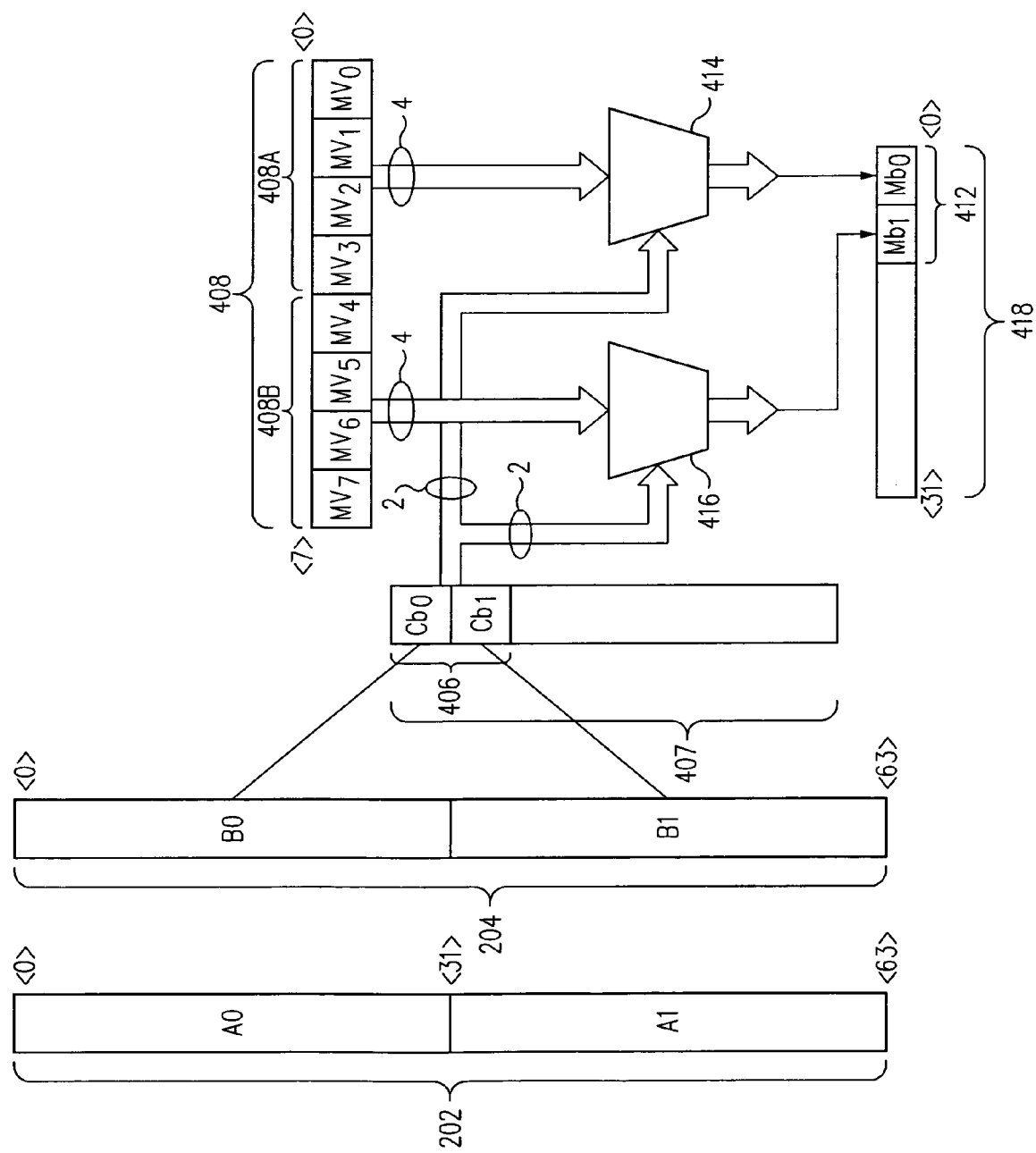
FIG. 4A is a schematic diagram illustrating the use of 4 to 1, 2-select digital multiplexers for mapping the bitmask results returned by a two-way SIMD compare instruction in accordance with the method of the present invention.
Figure 4B:
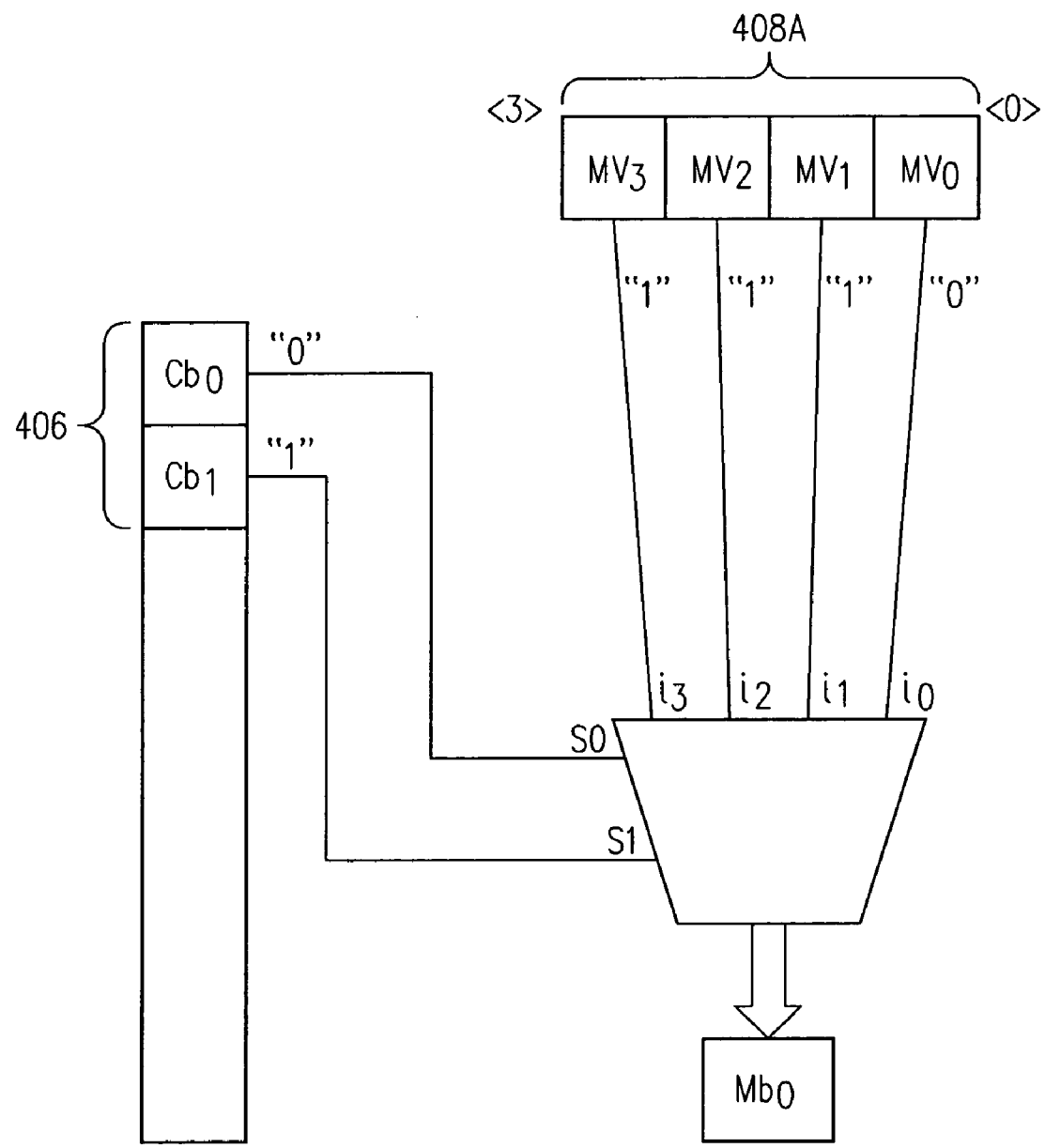
FIG. 4B is a schematic diagram illustrating a detailed view of a first 4 to 1, 2-select multiplexer of FIG. 4A.

FIG. 4A is a schematic diagram illustrating the use of multiplexers in the method for mapping the bitmap results returned by a two-way SIMD compare instruction in accordance with the present invention. FIG. 4B a schematic diagram illustrating a detailed view of one of the 4 to 1, 2-select multiplexers of FIG. 4A. Referring to FIGS. 4A and 4B together, the operation of one embodiment of the present invention, as implemented with the VIS extension of the UltraSPARC™ instruction set, can be understood by considering the general case of a two-way, SIMD compare operation on corresponding, 32-bit data elements contained in two 64-bit partitioned variables. In this general case, it is desired to map the value of a 2-bit compare bitmask 406 to any one of the four, ($2^2$), possible binary values of a two-bit bitmask, namely "00", "01", "10" or "11", onto mapped bitmask 412. The mapping is controlled by which of the four possible 2-bit values is originally present in compare bitmask 406 after the completion of the two-way, SIMD compare operation and by the value of a user-defined, 8-bit wide, partitioned mapping variable 408 (FIG. 4A).

As shown in FIG. 4A, a first 4 to 1, 2-select digital multiplexer 414 and a second 4 to 1, 2-select digital multiplexer 416 are used to perform the mapping. In this embodiment, a first bit $Cb_0$ and a second bit $Cb_1$ of compare bitmask 406, which were together returned by a VIS, two-way, SIMD compare instruction, are applied to a different one of the pair of first selects $S_0$-$S_2$ and the pair of second selects $S_1$–$S_3$ of first multiplexer 414 and second multiplexer 416, respectively. (FIG. 4B shows only $S_0$ of the pair of first selects $S_0$-$S_2$ and only $S_1$ of the pair of second selects $S_1$-$S_3$; selects not shown individually in FIG. 4A).

In FIG. 4A, input bits (Not shown individually) to first multiplexer 414 and second multiplexer 416 are supplied by the user in an 8-bit, partitioned mapping variable 408 selectively applied to the data inputs (Not shown individually) of the two multiplexers. A first 4-bit wide mapping element 408A and a second 4-bit wide mapping element 408B are contained within partitioned mapping variable 408. In FIG. 4B, the four bits $Mv_0$, $Mv_1$, $Mv_2$, and $Mv_3$ making up first mapping element 408A are applied, respectively, to the four inputs $i_0$, $i_1$, $i_2$, and $i_3$ of first multiplexer 414. Also, the four bits $Mv_4$, $Mv_5$, $Mv_6$, and $Mv_7$ making up second mapping element 408B are applied, respectively, to four inputs $I_4$, $I_5$, $I_6$, and $I_7$, of second multiplexer 416, (Not shown in FIG. 4B; Not shown individually in FIG. 4A).

As shown in detail in FIG. 4B, from the four bits $Mv_0$, $Mv_1$, $Mv_2$, and $Mv_3$ Of first mapping element 408A, applied, respectively, to the inputs $i_0$, $i_1$, $i_2$, and $i_3$ of first multiplexer 414., a first mapped bit $Mb_0$ is written to mapped output variable 418 as the least significant bit of mapped bitmask 412. Compare bitmask 406, applied to the selects $S_0$ and $S_1$ of first multiplexer 414, determines which of the four bits $Mv_0$, $Mv_1$, $Mv_2$, or $Mv_3$ will be output by multiplexer 414.

Similarly, as shown generally in FIG. 4A, from the four bits $Mv_4$, $MV_5$, $Mv_6$, and $Mv_7$ of second mapping element 408B, applied, respectively, to the inputs $i_4$, $i_5$, $i_6$, and $i_7$ of second multiplexer 416, a second mapped bit $Mb_1$ is written to mapped output variable 418 as the most significant bit of mapped bitmask 412. Compare bitmask 406, applied also to the selects $S_2$ and $S_3$ of second multiplexer 416, determines which of the four bits $Mv_4$, $Mv_5$, $Mv_6$, or $Mv_7$ will be output by multiplexer 416.

Thus, by properly specifying the user supplied mapping variable 408, any original 2-bit binary value of compare bitmask 406, as returned by a two-way, SIMD compare instruction, may be mapped as any possible 2-bit binary value to mapped bitmask 412.

By way of example, assume that a user is interested in returning a bitmask value of "11" for mapped bitmask 412 in mapped output variable 418 whenever one or both data keys correlate to a search key when compared by a VIS, two way, SIMD compare instruction in an information base recursive search. A positive compare condition at the completion of the instruction indicates that one or both data keys correlated to the search key. A negative compare condition at the completion of the instruction indicates that neither data key correlated to the search key. The "11" mapped bitmask value might be required, for example, when the user is performing a quick screening to determine if an information base includes at least one occurrence of a specified data key associated with a particular data value.

Those of skill in the art will recognize that this particular requirement can be satisfied using a standard branch instruction or other similar methods. The example presented above is for illustrative purposes and is provided to avoid unessarry complexity in presentation and thereby avoid detracting from the principals of the invention. In other examples, the present invention is advantageously utilized in M-ary searches discussed above where it is necessary to convert the value returned by the multi-way SIMD compare instruction into a form that is more amenable for use with lookup tables etc. for branching on any true compare result.

In this example, a "11" value of mapped bitmask 412 contained in mapped output variable 418, could re-direct the computer search algorithm to a routine reporting that at least one record in the information base exists that contains data associated with a data key that matches the specified search key. A "00" value of mapped bitmask 412 contained in mapped output variable 418, could direct the computer search algorithm to load another search key in both data elements A0 and A1 of first data variable 202 (FIG. 4A). A new multi-way search of data keys loaded in first and second data elements B0 and B1 of second variable 204 could then commence.

A value of "1110" for both first mapping element 408A and second mapping element 408B of map variable 408 accomplishes the desired exemplar result of mapping all positive, i.e., non-zero compare bitmask value, results to a mapped bitmask value of "11". Also, the value of "1110" for both first mapping element 408A and second mapping element 408B accomplishes the exemplar result of mapping a negative, i.e., zero compare bitmask value, result to a mapped bitmask value of "00".

Figure 5:
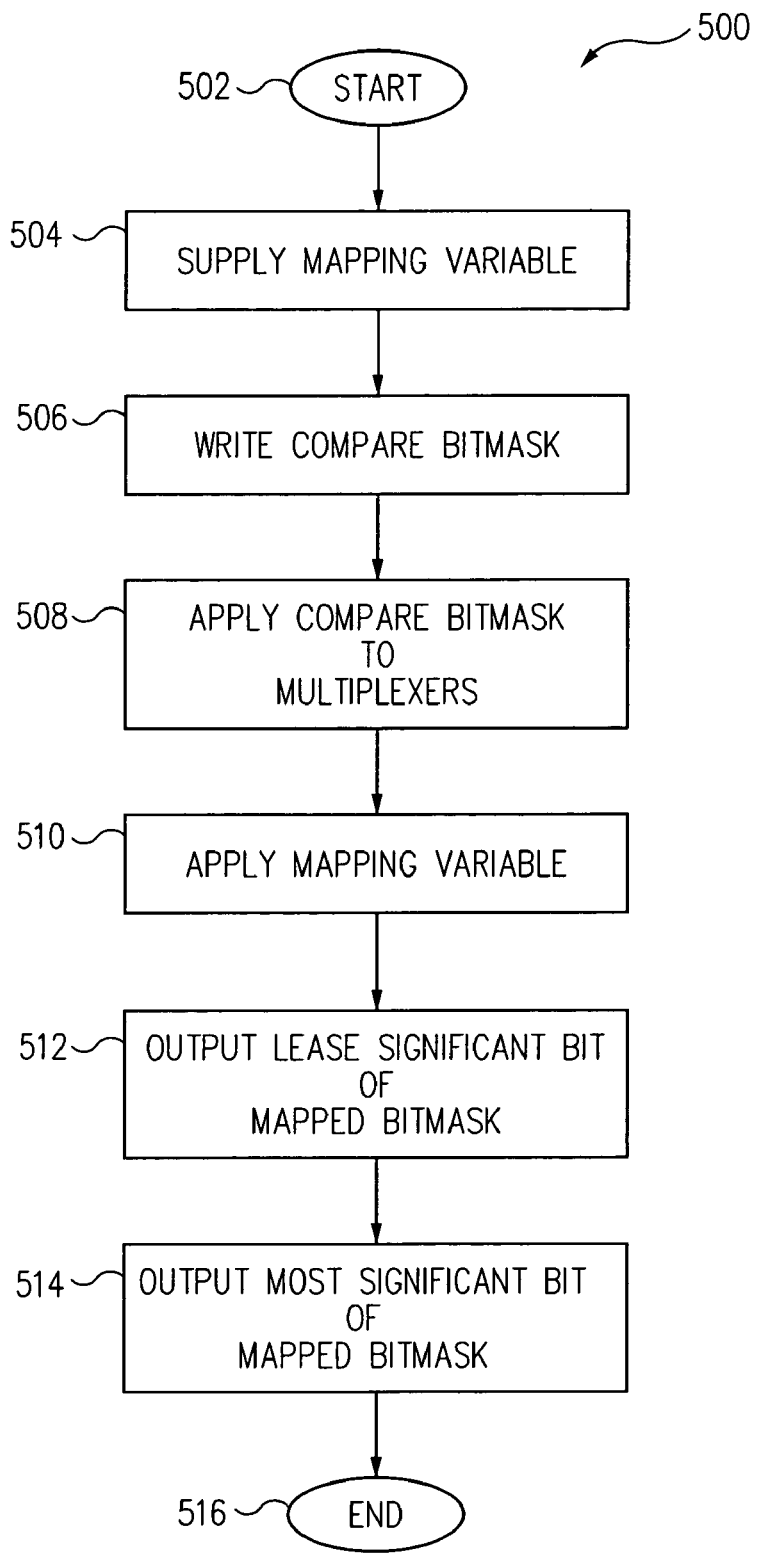
FIG. 5 is a process flow diagram illustrating the operations in mapping the results returned by a multi-way SIMD compare instruction in accordance with the method of the present invention.

FIG. 5 is a process-flow diagram of one embodiment of the multi-way, SIMD compare instruction mapping method according to the principles of the present invention. Referring to FIG. 4A, 4B, and 5 together, the present example case is analyzed.

Start operation 502 commences use of method 500 for the rapid interpretation and mapping of the results returned by a multi-way, SIMD compare instruction.

Operation 502 transfers to "Supply Mapping Variable" operation 504. When it is stated herein that a first operation transfers to a second operation, those of skill in the art understand that the first operation is completed and the second operation is started. At operation 504, a user of method 500 writes 8-bit mapping variable 408 to a storage location, such as, register 200 (FIG. 4A). Mapping variable 408 is partitioned on 4-bit boundaries and contains first mapping element 408A made up of bits $Mv_0$, $Mv_1$, $Mv_2$, and $Mv_3$ and contiguous second mapping variable 408B (FIG. 4A) made up of bits $Mv_4$, $Mv_5$, $Mv_6$, and $Mv_7$.

Operation 504 transfers to "Write Compare Bitmask" operation 506. At operation 506, a binary value, for example, "01" is written to compare bitmask 406 (FIG. 4A) contained in compare input variable 407 by operation of a VIS, two-way, SIMD compare instruction. The exemplar value of "01" for compare bitmask 406 reports a true compare condition between first data element A0 and corresponding first data element B0 in compared first data variable 202 and second data variable 204, respectively. Alternatively, a value "10" and "11" for compare bitmask 406 are other non-zero values that report true compare condition. A value of "10" reports a true compare condition between corresponding second data elements A1 and B1. A value of "11" reports a true compare conditions between both sets of corresponding first and second data elements A0/B0 and A1/B1.

Operation 506 transfers to "Apply Compare Bitmask to Multiplexers' Selects" operation 508. At operation 508, first compare bit $Cb_0$ of compare bitmask 406 is applied to each first select $S_0$, $S_2$ of, respectively, first multiplexer 414 and second multiplexer 416; and second compare bit $Cb_0$ of compare bitmask 406 is applied to each second select $S_1$, $S_3$ of, respectively, first multiplexer 414 and second multiplexer 416, (Only $S_0$ and $S_1$ are shown in FIG. 4B).

Operation 508 transfers to "Apply Mapping Variable". At operation 508, each of four bits $Mv_0$, $Mv_1$, $Mv_2$, and $Mv_3$, together having exemplar value "1110" and making up first mapping element 408A of user supplied mapping variable 408, is applied to a different one of first, second, third, and fourth inputs $i_0$, $i_1$, $i_2$, and $i_3$ of first multiplexer 414; and one of first, second, third, and fourth bits $Mv_4$, $Mv_5$, $Mv_6$, and $Mv_7$, (FIG. 4A) together also having exemplar value "1110" and making up second mapping element 408B of mapping variable 408, is applied to a different one of first, second, third, and fourth inputs $i_4$, $i_5$, $i_6$, and $i_7$ (Not shown in FIG. 4B; Shown generally in FIG. 4A) of second multiplexer 416.

After completion of operation 510, at "Output Least Significant Bit of Mapped Bitmask" operation 512, first multiplexer 414 outputs a binary value to mapped output variable 418 as the least significant bit of mapped bitmask 412. In the present example, where the exemplar value of compare bitmask 406 is "01", first multiplexer 414 outputs a binary value of "1". The exemplar compare bitmask value "01", applied to selects $S_0$ and $S_1$ of first multiplexer 414, directs the selection of the value of the second bit, i.e. $Mv_1$, of first mapping element 408A. The exemplar value of $Mv_1$ is "1" within first mapping element 408A. Recall that the exemplar value of first mapping element 408A is "1110".

After completion of, or simultaneous with, operation 512, at "Output Most Significant Bit of Mapped Bitmask" operation 514, second multiplexer 416 also outputs a binary value to mapped output variable 418, but as the most significant bit of mapped bitmask 412. In the present example, second multiplexer 416 also outputs a binary value of "1" since the exemplar compare mask value "01", applied also to the selects $S_2$–$S_3$ of second multiplexer 416, directs the selection of the value in the second bit position, i.e., bit $Mv_5$ of second mapping element 408B. The exemplar value of $Mv_5$ is "1" within exemplar second mapping element 408B.

Other non-zero values "10" or "11" for compare bitmask 406 will similarly map to value "11" in mapped bitmask 412 as can be readily observed by performing the above described method operations 504 to 514 for these values.

After completion of operation 514, use of method 500 ceases as operation 514 transfers to "End" operation 516 of method 500.

The user may now directly use the value of mapped bitmask 412 in mapped output bit mask 418, which is typically contained in a computer register, for any desired purpose such as specifying a next address offset for the commencement of a new search iteration in a M-ary search.

Figure 6A:
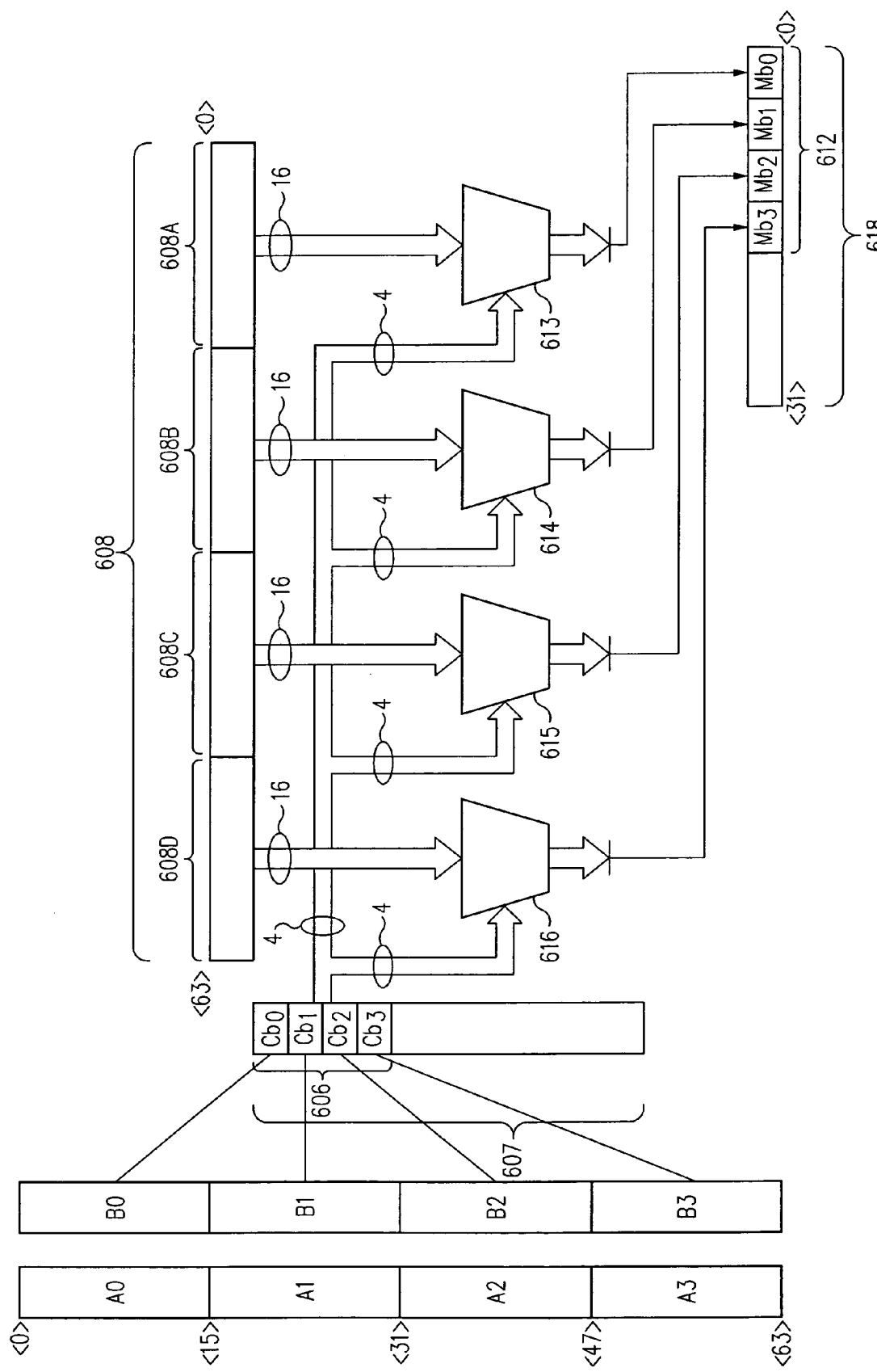
FIG. 6A is a schematic diagram illustrating the use of 16 to 1, 4-select, digital multiplexers for mapping the results returned by a four-way SIMD compare instruction in accordance with the method of the present invention.
Figure 6B:
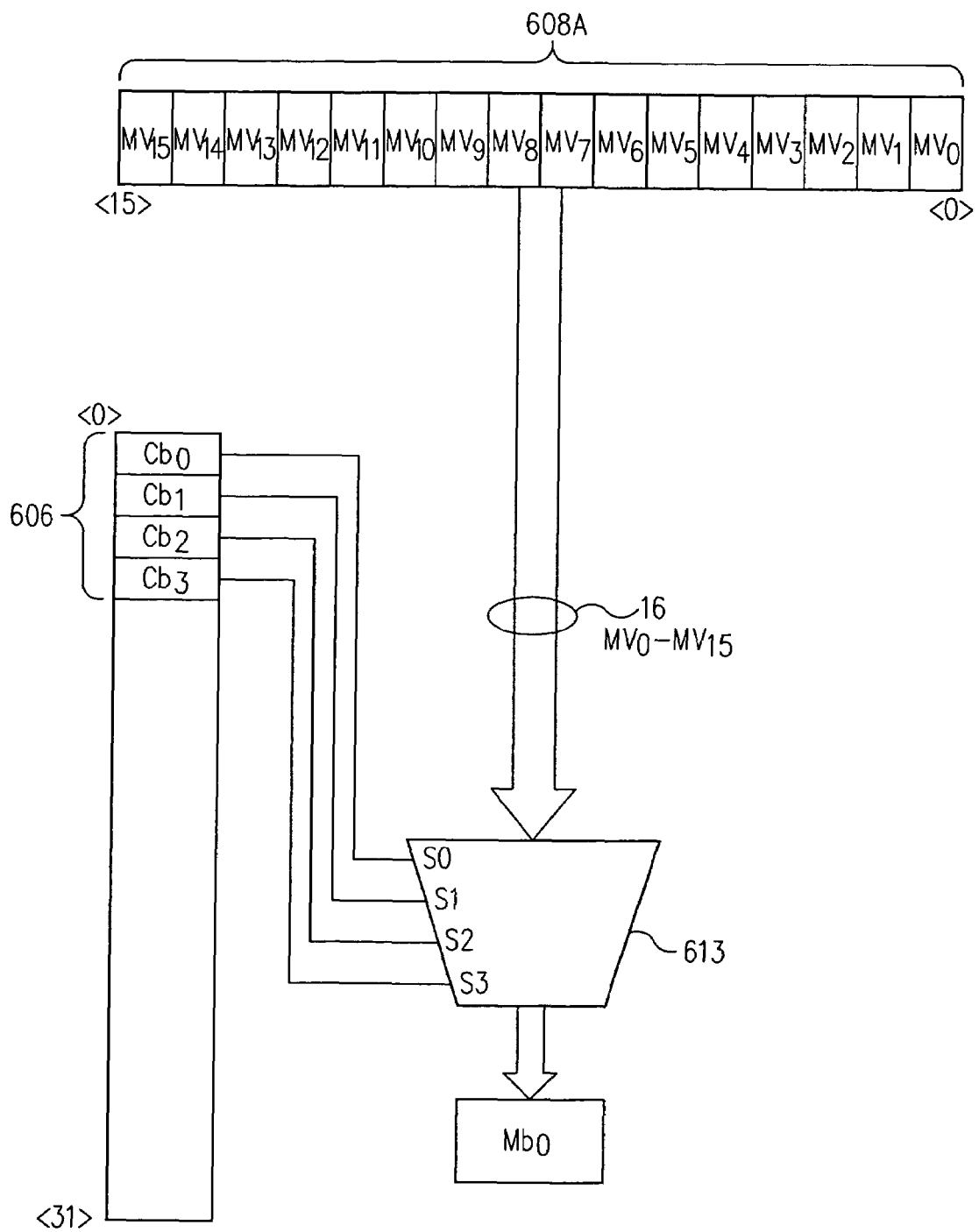
FIG. 6B is a schematic diagram illustrating a detailed view of the first 16 to 1, 4-select, digital multiplexer of FIG. 6A.

In one embodiment of the present invention, the generalized mapping of the value of a compare bitmask returned by a multi-way, SIMD compare instruction may be extended to the case of a VIS, four-way, SIMD compare instruction. FIG. 6A is a schematic diagram illustrating the use of four 16 to 1, 4-select, digital multiplexers for mapping the results returned by a four-way SIMD compare instruction in accordance with the method of the present invention. FIG. 6B is a schematic diagram illustrating a detailed view of one of the four 16 to 1, 4-select, digital multiplexers of FIG. 6A.

Referring to FIGS. 6A and 6B together, the operation of one embodiment of the present invention, as implemented with the VIS extension of the UltraSPARC™ instruction set, can be understood by considering the case of a four-way, SIMD compare operation on corresponding 16-bit data elements contained in two 64-bit partitioned variables. In this embodiment, it is desired to map a 4-bit compare bitmask 606 to any of the sixteen ($4^2$) possible binary values of a four-bit bitmask, namely "0000", "0001", "0010", "0011", "0100", "0101", "0110", "0111", "1000", "1001", "1010", "1011", "1100", "1101", "1110", or "1111", onto mapped bitmask 612. The particular mapping desired is controlled by which of the sixteen possible values is originally present in the compare bitmask 606 after the completion of a four-way, SIMD compare operation and the value of a user-defined 64-bit wide, partitioned mapping variable 608.

As shown in FIG. 6A, a first, a second, a third, and a fourth 16 to 1, 4-select digital multiplexer 613, 614, 615, and 616, respectively, are use to perform the mapping. In this embodiment, each of a first, a second, a third, and a fourth compare bit $Cb_0$, $Cb_1$, $Cb_2$, and $Cb_3$, respectively, of compare bitmask 606 returned by a VIS, four-way, SIMD compare instruction, is applied to a different one group of the four groups of first selects $S_0$-$S_4$-$S_8$-$S_{12}$, second selects $S_1$-$S_5$-$S_9$-$S_{13}$, third selects $S_2$-$S_6$-$S_{10}$-$S_{14}$, and fourth selects $S_3$-$S_7$-$S_{11}$-$S_{15}$ of the multiplexers (Selects not shown individually).

Input bits to first, second, third, and fourth multiplexers 613, 614, 615, and 616, respectively, are supplied by the user in an 64-bit, partitioned mapping variable 608 selectively applied to the input lines of the four multiplexers. A first, a second, a third, and a fourth, 16-bit wide mapping element 608A, 608B, 608C, and 608D, respectively, are within partitioned mapping variable 608. Each of the 16 bits $Mv_0$ through, $Mv_{15}$, of first mapping element 608A is applied to a different one of the 16 inputs $i_0$ through $i_{15}$ (Not shown individually) of first multiplexer 613.

Likewise, each of the 16 bits $Mv_{16}$ through $Mv_{31}$, $Mv_{32}$ through $Mv_{47}$, and $Mv_{48}$ through $Mv_{63}$, of second, third, and fourth mapping element 614, 615, and 616 is applied to a different one of the groups of first through sixteenth inputs of the respective multiplexers.

From the 16 bits $Mv_0$ through $Mv_{15}$ (FIG. 6B) of mapping element 608 applied, respectively, to the inputs $i_0$ through $i_{15}$ of first multiplexer 613, a first mapped bit $Mb_0$ is written to mapped output variable 618 as the least significant bit of mapped bitmask 612. Compare bitmask 606, applied to the selects $S_0$, $S_1$, $S_2$, and $S_3$ of first multiplexer 613, determines which of the sixteen bits $Mv_0$ through $Mv_{15}$ will be output by multiplexer 613.

Similarly, from the 16 bits of each of the second, third and fourth mapping elements 608B, 608C, and 608D that are applied, respectively, to the imputs of second, third and fourth multiplexers 614, 615, and 616, increasingly significant mapped bits $Mb_1$, $Mb_2$, and $Mb_3$ are written to mapped output variable 618. Again, compare bitmask 606, applied also to the selects of multiplexers 614, 615 and 616, determines which one of the sixteen bits of each of mapping elements 608B, 608C and 608D, will be output by multiplexer 614, 615, and 616, respectively.

Thus, by properly specifying user supplied mapping variable 608, any original 4-bit binary value of compare bitmask 606, as returned by a four-way, SIMD compare instruction, may be mapped as any possible 4-bit binary value to mapped bitmask 612. By way of example analogous to the two-way compare example discussed above, a compare bitmask value of "1111111111111110" in each the first, second, third and fourth mapping elements 608A, 608B, 608C and 608D of mapping variable 608 would map to a value of "11111111" in mapped bit mask 612 whenever at least one set of corresponding data elements satisfied the compare condition specified by a four-way, SIMD compare instruction.

In other embodiments of the present invention, the generalized mapping of the value of a compare bitmask returned by a multi-way, SIMD compare instruction may be extended to include any number of parallel compares that the instruction is capable of performing. In general an M-bit wide binary compare bitmask, returned by an M-way, SIMD compare instruction, is applied to the selects of each of M multiplexers. Each of the M multiplexers is adapted to receive $M^2$ inputs and M selects, and to output one bit. A user supplies an $M^3$-bit wide mapping variable partitioned at $M^2$-bit wide boundaries into M mapping elements. Each of the M mapping elements is applied to the $M^2$ inputs of a different one of the M multiplexers. Each bit of each $M^2$-bit wide mapping element is applied to a different one of the $M^2$ inputs of its respective multiplexer. The M, 1-bit outputs of the M multiplexers are written to a different one of M bits making-up a mapped bit mask in a map output variable.

An alternative approach for providing a compare bitmask mapping functionality as a separate instruction would be to integrate this functionality directly into the multi-way, SIMD compare instructions itself. Before returning the standard compare results, the multi-way, SIMD compare instruction automatically undertakes the specified mapping, using a dedicated register such as the Ultra SPARC's™ Graphic Status Register (GSR) as the medium by which to make the necessary mapping information available.

Thus the present invention overcomes the limitations and disadvantages of the prior art. The present invention provides a method for the rapid interpretation of the results returned by a multi-way SIMD compare instruction. The method avoids the computer processing overhead associated with prior art approaches to interpretation. More particularly, the present invention provides for complete flexibility in the manipulation and mapping of the compare results returned by the multi-way SIMD instruction.

While configurations and methods according to the invention have been particularly shown and described with reference to specific embodiments, it will be understood by those skills in the art that various other changes in the form and details may be made without departing from the spirit and scope of the invention.

What is claimed is:

1. A method for the rapid interpretation of the results returned by a multi-way SIMD compare instruction comprising:

providing a compare bitmask returned by a multi-way, SIMD compare instruction;

providing M digital multiplexers, wherein M equals a positive integer greater than 1, each of said multiplexers having $M^2$ inputs, M selects and one bit output;

reading said compare bitmask having M bits;

supplying an $M^3$-bit wide variable, said $M^3$-bit wide variable being virtually partitioned at $M^2$-bit wide boundaries into M mapping elements;

applying each of said M bits of said compare bitmask to a different one of said M selects of all of said M multiplexers;

applying each of said M mapping elements to said $M^2$ inputs of a different one of said M multiplexers; and writing each of said one bit output of said M multiplexers to a different one of M bits making up a mapped bitmask.

2. The method of claim 1 further comprising:

accumulating said one output of said each of said M multiplexers in a mapped variable.

3. The method of claim 1, wherein said multi-way, SIMD computer instruction is the multi-way, SIMD compare instruction of the VIS instruction set as implemented on a UltraSPARC™ microprocessor.

4. The method of claim 1, wherein said multi-way, SIMD computer instruction is used to locate a data value in an information base.

5. The method of claim 1, wherein said multi-way, SIMD computer instruction is used to process digital signals.

6. The method of claim 1 wherein M equals 2.

7. The method of claim 1 wherein M equals 4.

8. The method of claim 1 wherein M is an integer greater than 4.

9. The method of claim 2 further comprising:

using said mapped variable to determine a computer address pointer offset.

* * * * *